United States Patent
Molnar et al.

(10) Patent No.: US 8,185,057 B2
(45) Date of Patent: May 22, 2012

(54) UPLINK CHANNEL QUALITY FEEDBACK REDUCTION IN A MOBILE COMMUNICATION SYSTEM

(75) Inventors: Karl Molnar, Cary, NC (US); Stephen Grant, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 707 days.

(21) Appl. No.: 12/346,313

(22) Filed: Dec. 30, 2008

(65) Prior Publication Data
US 2010/0167657 A1     Jul. 1, 2010

(51) Int. Cl.
*H04B 17/00*     (2006.01)
(52) U.S. Cl. ................................................ 455/67.11
(58) Field of Classification Search ............... 455/67.11, 455/67.13, 67.14
See application file for complete search history.

(56) References Cited

U.S. PATENT DOCUMENTS

| 7,986,919 B2 * | 7/2011 | Kangas et al. | 455/63.1 |
| 2003/0123396 A1 * | 7/2003 | Seo et al. | 370/252 |
| 2008/0057969 A1 * | 3/2008 | Agami et al. | 455/450 |

FOREIGN PATENT DOCUMENTS
EP     1 499 056 A1     1/2005

* cited by examiner

*Primary Examiner* — Jeffrey Zweizig

(57) ABSTRACT

Operating a user equipment in a mobile communication system includes generating a measure of reliability of a predicted channel estimate and of impairment stability, wherein the predicted channel estimate is a predicted estimate of a channel between the user equipment and a node of the mobile communications system. Transmission of a channel quality report to the node of the mobile communication system is controlled as a function of the generated measure of reliability of the predicted channel estimate and of impairment stability. Transmission control includes inhibiting transmission of the channel quality report to the node of the mobile communication system for a duration of time corresponding to the measure of reliability of the predicted channel estimate and of impairment stability.

26 Claims, 6 Drawing Sheets

UPLINK CHANNEL QUALITY FEEDBACK REDUCTION IN A MOBILE COMMUNICATION SYSTEM

BACKGROUND

The present invention relates to methods and arrangements in a telecommunication system, and more particularly to methods and arrangements for efficiently utilizing radio resources to communicate channel quality information from a user equipment to a network node in the telecommunication system.

Wireless mobile communication systems often rely on some form of arrangement such as that illustrated in FIG. 1. As shown, a base station 101 communicates with a mobile device (which is often generically referred to in the art as a user equipment (UE)) 103, via a multipath channel 105. Because the signal transmitted (e.g., by radio waves) by the base station 101 spreads out into the environment and these spread signal components are often reflected off of any number of objects, the transmitted signal reaches the UE 103 via more than one path. Therefore, in addition to the direct path 107 from the base station 101 to the UE 103, there are a number of other indirect paths 109. The contributions from these indirect paths exhibit different signal attenuations and time delays relative to that from the direct path, and these contributions may interfere with the contribution from the direct path either constructively or destructively at the UE's receiver input. The signal components caused by the direct path 107 and the indirect paths 109 are denoted multipath components and can be modeled by a complex channel filter function either in the time domain as a channel impulse response or, correspondingly, as a channel frequency response in the frequency domain.

FIG. 2 is a block diagram illustrating in greater detail a number of aspects of some mobile communication systems. In this example, so-called multiple-input, multiple-output (MIMO) communication technology is used. MIMO systems employ multiple antennas at the transmitter and receiver to transmit and receive information. The receiver can exploit the spatial dimensions of the signal at the receiver to achieve higher spectral efficiency and higher data rates without increasing bandwidth. As shown in FIG. 2, a base station 201 communicates with a UE 203 via a multipath channel 205. In downlink transmissions, an information signal, I(t), (e.g., in the form of a binary data stream) is supplied to the base station 201. The base station 201 includes a controller 207 and a transmit signal processing circuit 209. The controller 207 controls operation of the base station 201 and schedules UEs 203 to receive data on a downlink channel. The transmit signal processing circuit 209 performs such functions as error coding, mapping the input bits to complex modulation symbols, and generating transmit signals for each of one or more transmit antennas 211, which may be independent, partially redundant, or fully redundant. After upward frequency conversion, filtering, and amplification, the base station 201 transmits the transmit signals from respective transmit antennas 211 through the channel 205 to the UE 203.

Receiver equipment in the UE 203 demodulates and decodes the signal received at each of its antennas 213. The UE 203 includes a controller 215 to control operation of the UE 203 and a receive signal processing circuit 217. The receive signal processing circuit 217 demodulates and decodes the signal transmitted from the base station 201. In the absence of bit errors, the output signal from the UE 203, Î(t), will be the same as the original information signal I(t).

While FIGS. 1 and 2 generically illustrate components of a mobile communication system, implementation details can vary from one system to another. A number of different standards that govern the design and operation of mobile telecommunication systems are known. For example, High Speed Downlink Packet-data Access (HSDPA) is an evolution of Wideband Code Division Multiple Access (WCDMA) specified in the Release 5 version of the Third-generation Partnership Project (3GPP) WCDMA specification. HSDPA introduces higher bit rates (up to over 10 Mbits/s) by using higher order modulation (16-QAM), multicodes (up to 15 with spreading factor 16), and downlink channel feedback information. Downlink channel feedback information is information, sent to the base station, regarding the downlink channel quality. The base station (BS), which in 3GPP terminology is called "node B", uses this information to optimize modulation and coding for optimized throughput. Furthermore, Hybrid ARQ is also introduced on the physical layer in order to reduce the round trip delay for erroneous received packets.

HSDPA works according to the following. A User Equipment (UE), operating in connected mode, continuously transmits Channel Quality Index (CQI) reports to the HSDPA serving node B by means of the uplink (UL) High Speed Dedicated Physical Control Channel (HS-DPCCH). The CQI informs the serving node B about the instantaneous downlink (DL) channel quality in order to enable the node B to optimize the downlink throughput. The CQI could, for example, be a function of Signal to Interference Ratio (SIR), where the particular function depends on higher layer parameters (e.g., available HS-power, and the like). When the UE is scheduled by the node B and data packets will be transmitted to the UE, the HS Shared Control Channel (HS-SCCH) is used to inform the UE about information that the UE will use in the upcoming communication, such as information about the data packets and transport format, retransmission number, and the like.

The downlink packet-data enhancements of HSDPA are complemented by "Enhanced Uplink", introduced in Release 6 of the 3GPP/WCDMA specifications. HSDPA and Enhanced Uplink are often jointly referred to as High-Speed Packet Access (HSPA).

To take another example, a new flexible cellular system, called Third Generation Long Term Evolution (LTE), can be seen as an evolution of the 3G WCDMA standard. This system will use OFDM as the multiple access technique (called OFDMA) in the downlink and will be able to operate on bandwidths ranging from 1.4 MHz to 20 MHz. Furthermore, data rates up to and exceeding 100 Mb/s will be supported for the largest bandwidth. However, it is expected that LTE will be used not only for high rate services, but also for low rate services like voice. Since LTE is designed for Transmission Control Protocol/Internet Protocol (TCP/IP), Voice over IP (VOIP) will likely be the service that carries speech.

Like HSPA, in LTE systems channel quality information is computed at the UE. This computation is based on reference pilot data transmissions, and is used for link adaptation (e.g., determining modulation and coding rates for the scheduled user). In these and other similar systems, the base station typically retains control for making decisions regarding user scheduling and link adaptation because the base station has the knowledge of the CQI reports from all users as well as specific data transmission requirements for each user.

The inventors of the inventive subject matter described herein have noted that there is a delay between when the mobile computes the CQI information and when the base station makes a downlink transmission based on the corresponding CQI report. This delay results in a potential mismatch in the CQI at the time of transmission because the channel may have changed in the time between CQI reporting and the subsequent downlink transmission. This mismatch will be greater for higher fading rates, but there may still be some mismatch for lower rates. One method for compensating for this mismatch is to predict what the fading channel will be at a time when the downlink transmission will occur, and compute the CQI based on this predicted channel. Such an approach is described in PCT Pub. No. WO2007/032715, which also discloses techniques for a first network unit of a communication system estimating the reliability of the predicted channel estimate that is to be used for link adaptation, and communicating this reliability estimate to a second network unit. The second network unit can then take this information into account when deciding on, for example, selection of a transmission scheme for use when communicating with the first network unit.

Another reason why a reported CQI value might not be a reliable basis upon which to make scheduling and link adaptation decisions is interference that varies from one time to another.

Despite their imperfect nature, CQI reports are nonetheless an important factor in the quality of mobile telecommunications service. There are a number of issues with CQI reporting that are considered below:

The CQI reports are considered a fixed resource, with mobiles making CQI reports periodically at some scheduled rate. As the number of mobiles increases within a system, the number of CQI transmission increases, placing a greater load on the uplink resources.

More advanced multi-antenna transmission schemes (e.g., MIMO) are being introduced that require a greater amount of feedback per mobile, thus increasing the load on the uplink feedback rate even further. This effect can be partially reduced by an approach described in US Patent Pub. 2005/0143084, which selects between either the single-antenna CQI report or the multi-antenna CQI report based on some criteria to control the system's CQI feedback rate. Thus, while there are different CQI reports corresponding to different mobile classes, a baseline CQI report is still made from each mobile.

An estimate of the channel prediction error reliability can also be included as part of the CQI report as described in the above-referenced PCT Pub. No. WO2007/032715. However, this further adds to the load on the uplink feedback rate. Alternatively, the channel prediction error reliability can be computed at the base station, but this requires channel estimates to be available at the base station.

In CDMA systems, the increased load on the uplink feedback rate has the effect of increasing the so-called noise-rise, which is the apparent interference-plus-noise level observed by the base station.

Another issue is related to the time-varying nature of the CQI estimate. The CQI report contains a fixed number of bits that is transmitted from the mobile to the base station during every CQI reporting period. This occurs regardless of whether the CQI values have changed significantly (or not) from one CQI report to the next.

It is therefore desirable to provide methods and apparatuses that efficiently utilize radio resources to communicate channel quality information from a user equipment to a network node in the telecommunication system

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatus that control operation of a user equipment in a mobile communication system. Such operation includes generating a measure of reliability of a predicted channel estimate and of impairment stability, wherein the predicted channel estimate is a predicted estimate of a channel between the user equipment and a node of the mobile communications system. Transmission of a channel quality report to the node of the mobile communication system is controlled as a function of the generated measure of reliability of the predicted channel estimate and of impairment stability.

In another aspect, controlling the transmission of the channel quality report to the node of the mobile communication system as a function of the generated measure of reliability of the predicted channel estimate and of impairment stability includes inhibiting transmission of the channel quality report to the node of the mobile communication system for a duration of time corresponding to the measure of reliability of the predicted channel estimate and of impairment stability.

Some embodiments consistent with the invention include, prior to inhibiting transmission of the channel quality report to the node of the mobile communication system for the duration of time corresponding to the measure of reliability of the predicted channel estimate and of impairment stability, transmitting to the node of the mobile communication system an indicator that transmission of the channel quality report will be inhibited.

In another aspect, some embodiments include receiving one or more signals from the node of the mobile communication system, and deriving therefrom one or more signal to interference and noise ratio measurements. A measure of how much the signal to interference and noise ratio of the received one or more signals varies over time is ascertained and the measure of reliability of the predicted channel estimate and of impairment stability is based on the measure of how much the signal to interference and noise ratio of the received one or more signals varies over time.

In yet another aspect, in some embodiments the measure of reliability of the predicted channel estimate and of impairment stability comprises a part that is representative of reliability of the predicted channel estimate and a part that is representative of reliability of impairment stability, and the part that is representative of reliability of the predicted channel estimate is generated as a function of a variance of a channel prediction error.

In still another aspect, in some embodiments an impairment covariance matrix is estimated and total impairment power is determined from the impairment covariance matrix. The measure of reliability of the predicted channel estimate and of impairment stability comprises a part that is representative of reliability of the predicted channel estimate and a part that is representative of reliability of impairment stability; and the part that is representative of impairment stability is generated by means of a process that comprises determining how quickly the total impairment power varies.

In alternative embodiments, an instantaneous impairment covariance matrix is estimated and a smoothed impairment covariance matrix is generated from two or more previously determined covariance matrices. In these embodiments, the measure of reliability of the predicted channel estimate and of impairment stability comprises a part that is representative of reliability of the predicted channel estimate and a part that is representative of reliability of impairment stability; and generating the part that is representative of impairment stability includes comparing the instantaneous impairment covariance matrix with the smoothed impairment covariance matrix.

In yet other alternative embodiments, a data covariance matrix is estimated, and total data power is determined from the data covariance matrix. In these embodiments, the measure of reliability of the predicted channel estimate and of impairment stability comprises a part that is representative of reliability of the predicted channel estimate and a part that is representative of reliability of impairment stability and generating the part that is representative of impairment stability includes determining how quickly the total data power varies.

In still another aspect of some embodiments, operating the user equipment includes estimating a measure of a channel prediction error. In these embodiments, the measure of reliability of the predicted channel estimate and of impairment stability comprises a part that is representative of reliability of the predicted channel estimate and a part that is representative of reliability of impairment stability; and generating the part that is representative of reliability of the predicted channel estimate comprises determining a variance of the channel prediction error.

In some embodiments, controlling the transmission of the channel quality report to the node of the mobile communication system as a function of the generated measure of reliability of the predicted channel estimate and of impairment stability includes transmitting to the node of the mobile communication system an indicator of a duration of time corresponding to the measure of reliability of the predicted channel estimate and of impairment stability. Some but not necessarily all of these embodiments further include transmitting to the node of the mobile communication system an indicator of a recommended start and recommended ending modulation and coding schemes for use during a period of time when transmission of the channel quality report to the node of the mobile communication system will be inhibited.

Some aspects are achieved in methods and apparatuses for operating a node in a mobile communication system, wherein the node serves a user equipment located within a service area of the node. Such embodiments include receiving a signal from the user equipment, wherein at least a portion of the signal is reserved for conveying a channel quality report and receiving a duration value from the user equipment. A channel quality report is estimated for use in determining modulation and coding schemes for use in subsequent transmission operations whenever the received signal does not include the channel quality report. Estimating the channel quality report for use in determining modulation and coding schemes for use in subsequent transmission operations includes using a received channel quality report that was most recently received from the user equipment as an estimate of a next channel quality report. Furthermore, using the received channel quality report that was most recently received from the user equipment as the estimate of the next channel quality report continues for an amount of time corresponding to the received duration value or until a new channel quality report is received from the user equipment, whichever is shorter.

Other aspects are embodied in alternative methods and apparatuses for operating a node in a mobile communication system, wherein the node serves a user equipment located within a service area of the node. These alternative methods and apparatuses involve receiving a signal from the user equipment and ascertaining whether the received signal includes a channel quality report. If it is ascertained that the received signal does not include the channel quality report, then a channel quality report is estimated for use in determining modulation and coding schemes for use in subsequent transmission operations. In these embodiments, estimating the channel quality report for use in determining modulation and coding schemes for use in subsequent transmission operations includes predicting a channel quality report and using, as an estimate of a next channel quality report, whichever one of a channel quality report that was most recently received from the user equipment and the predicted channel quality report indicates a worse channel quality.

Still other aspects are embodied in other alternative methods and apparatuses for operating a node in a mobile communication system, wherein the node serves a user equipment located within a service area of the node. These alternative methods and apparatuses involve receiving a signal from the user equipment and ascertaining whether the received signal includes a channel quality report. If it is ascertained that the received signal does not include the channel quality report, then a channel quality report is estimated for use in determining modulation and coding schemes for use in subsequent transmission operations. In these embodiments, estimating the channel quality report for use in determining modulation and coding schemes for use in subsequent transmission operations includes predicting a channel quality report and generating a filtered channel quality report from the predicted channel quality report and one or more channel quality reports that were most recently received from the user equipment. The filtered channel quality report is used as an estimate of a next channel quality report. In some of these embodiments, generating a filtered channel quality report from the predicted channel quality report and one or more channel quality reports that were most recently received from the user equipment comprises applying linear interpolation to the predicted channel quality report and one or more channel quality reports that were most recently received from the user equipment.

BRIEF DESCRIPTION OF THE DRAWINGS

The objects and advantages of the invention will be understood by reading the following detailed description in conjunction with the drawings in which.

DETAILED DESCRIPTION

Figure 1:
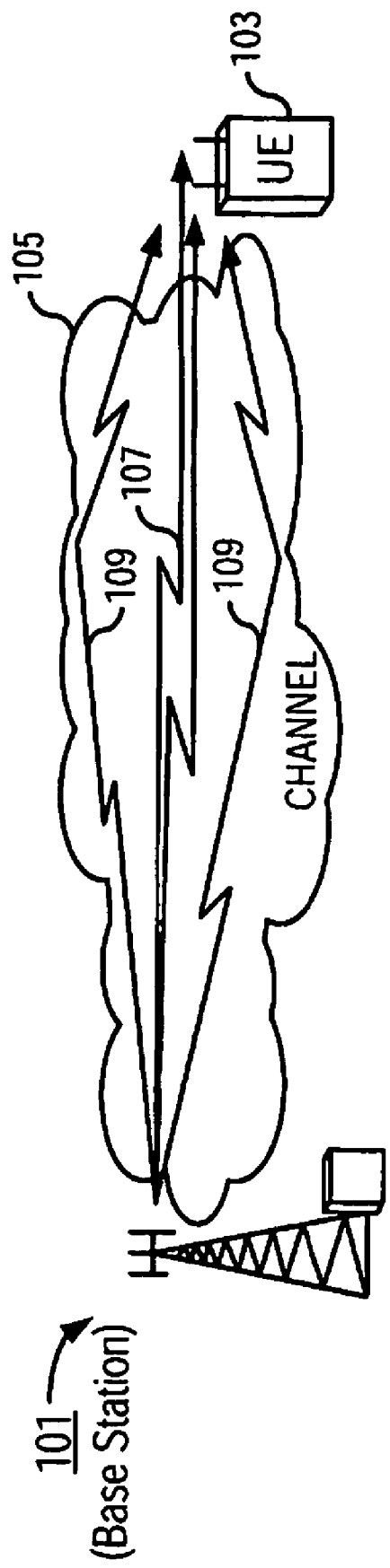
FIG. 1 is an exemplary arrangement of components in a wireless mobile communication system.
Figure 2:
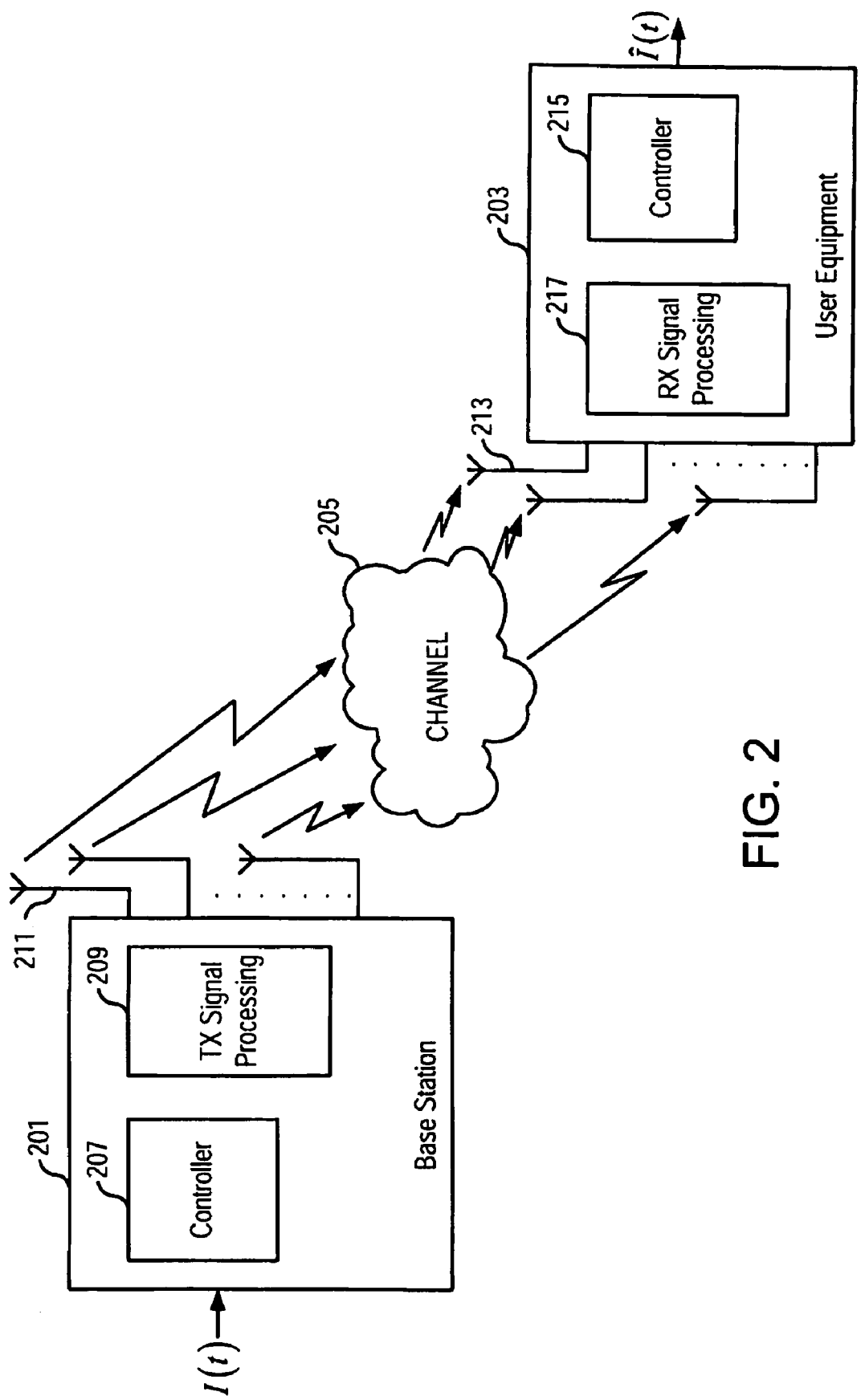
FIG. 2 is a block diagram illustrating in a number of aspects of components in some mobile communication systems.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action, or alternatively as "means for" performing a described function.

In an aspect of embodiments consistent with the invention, the predictability of a channel quality measure (e.g., CQI) reported to the base station from a UE is used as a basis for controlling transmission of those reports. Determination of the channel quality measure predictability is based both on the reliability of a predicted future channel estimate as well as the stability of the interference environment observed at the UE.

In another aspect of embodiments consistent with the invention, when the channel quality can be predicted with sufficient reliably, it is not required for the UE to send a channel quality report. In this case, the base station must detect whether a channel quality report has been transmitted and make any adjustments based on the result of this detection. In some embodiments, the base station employs blind detection techniques to determine whether a channel quality report is present. In other embodiments, the base station receives a communication from the UE informing that one or more channel quality reports will be skipped.

These and other aspects of embodiments consistent with the invention will now be described in greater detail.

Figure 3:
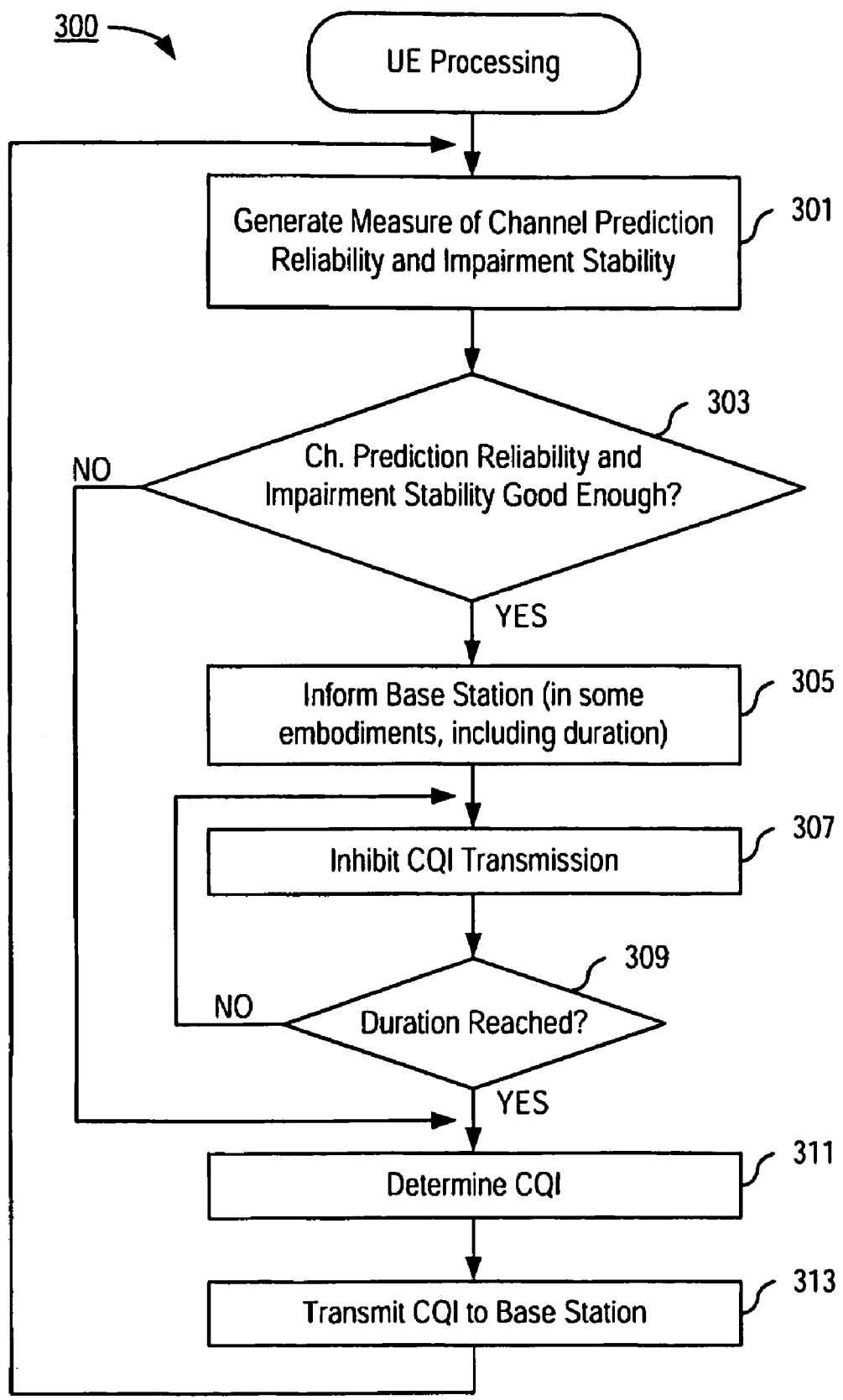
FIG. 3 is, in one respect, a flow chart of steps/processes carried out by, for example, a controller in a UE in accordance with aspects of the invention.

FIG. 3 is, in one respect, a flow chart of steps/processes carried out by, for example, a controller 300 in a UE in accordance with aspects of the invention. In other respects, FIG. 3 can be considered to depict a block diagram of logic configured to perform the variously illustrated functions.

This functionality begins with the UE generating a measure of reliability of a predicted channel estimate and of impairment stability (step 301). As used herein, the term "impairment" is used generically to refer to any source of signal distortion, such as interference, noise, or a combination of interference plus noise. The predicted channel estimate is a prediction of what a channel between the user equipment and a node of the mobile communications system (e.g., a base station) will be at a future point in time, for example a time when the base station will be transmitting information to the UE.

The measure of reliability of the predicted channel estimate and of impairment stability can be made in a number of alternative ways. For example, a CQI value is inherently based on a signal to interference plus noise ratio (SINR) obtained at the receiver, so a measure of the SINR and its underlying quantities can be used to determine both predicted channel estimate reliability and impairment stability. More particularly, the UE ascertains a measure of how much the SINR of received signals varies over time, and uses this as a measure of both channel (and hence CQI) prediction reliability and of impairment stability. For example, this variability measure can be compared with one or more threshold values that define for the UE whether the channel and interference are stable (and hence predictable).

In alternative embodiments, separate measures of the channel and interference are used instead of SINR values to determine channel and impairment stability. For example, a measure of channel reliability can be obtained by means of techniques described in the above-referenced PCT Pub. No. WO2007/032715. In particular, a reliability measure can be a distribution function of the deviations of the prediction values. Channel prediction uncertainty can be described by the prediction error. There are a number of ways to characterize this prediction error. These include the error variance, or the standard deviation of the error, for each measured channel tap; the sum of the error variance of the measured channel taps; or the maximum error variance of the measured channel taps. These can be based on all channel taps, or alternatively just the best M taps, where M is a design parameter.

In alternative embodiments of the invention, a measure of channel reliability can be derived by means of heuristic techniques. For example, the channel can be observed over a period of time, and its stability determined from these observations (e.g., by determining whether a plot of the channel coefficients is flat, and hence stable over time).

Regarding impairment stability, it can be ascertained from an impairment covariance matrix that is estimated at the receiver. (As used herein, the term "impairment" refers generically to interference alone or interference plus noise.) The sum of the diagonal elements (i.e., the trace) of the matrix measures the total impairment power. Consequently, ascertaining how quickly the impairment power varies yields a good measure of the impairment stability. The impairment stability can, for example, be a measure of the instantaneous impairment covariance with respect to a smoothed impairment covariance. There may be different cases which indicate the presence of stable interference, and these are listed below.

One case where the interference is stable is when there is an interferer (or interferers) that are persistent, so that the short-term and long-term covariance estimates are similar. This represents a slowly changing interference environment that favorably influences a decision to withhold channel quality reports for some period of time.

Another case is when there is noise-only interference and the noise power is persistent. This can be established by determining the variability over time of the diagonal terms of the impairment covariance indicating a stable noise scenario, as well as determining that the off-diagonal terms are close to zero. This represents a stable noise environment.

In another instance, the use of the long-term covariance for CQI computation may itself be an indication of a stable interference environment due to its being computed based on a time-frame that is longer than the duration of a CQI report inhibition. By filtering out the short-term covariance changes due to the interference, this may result in a stable (and more predictable) interference scenario (so long as it adheres to the previous two cases described above). The short-term interference covariance can still be used for detection purposes as this may result in better detection performance.

As an alternative, a data covariance matrix can be used instead of an impairment covariance matrix. Typically, the data covariance is the sum of the impairment covariance and the desired signal covariance. So, if the desired signal covariance is known, for example, from computing it based on reference pilot signals, then the impairment covariance can be estimated, or at least the influence due to the impairment can be determined. This, then, enables one to ascertain a measure of the impairment stability, as described above.

When the interference does not change rapidly, stability is indicated, which favorably influences a decision not to transmit a channel quality (e.g., CQI) report. (See further details below.)

It is worth noting that, if the interference is found to be changing sufficiently rapidly (with "sufficiency" being an application specific parameter), it can be assumed that any reported channel quality measure will be unreliable by the time it is used by the report recipient as a basis for determining transmission parameters. Such circumstances similarly favor a decision not to transmit a channel quality report. Thus, in accordance with an aspect of embodiments consistent with the invention, although a quickly changing interference environment is not "stable" in the traditional sense, it is considered to be stable for purposes of deciding whether to transmit a channel quality report.

Returning to the discussion of FIG. 3, transmission of the channel quality report to the base station is controlled as a function of the generated measure of reliability of the predicted channel estimate and of impairment stability. For example, in the exemplary embodiment this involves comparing the measure(s) of predicted channel estimate reliability and of impairment stability with a corresponding one or more threshold values to determine whether they are sufficiently reliable/stable (decision block 303). If they are ("YES" path out of decision block 303), then in some but not all embodiments, the base station is informed that an upcoming channel quality report transmission will be inhibited (step 305). In some but not necessarily all of these embodiments, the base station can be further informed of the expected duration of the period of time during which no channel quality report will be sent.

In embodiments that do not inform the base station in advance that one or more channel quality reports will not be transmitted, the base station relies on blind detection techniques to ascertain the presence or absence of any given channel quality report.

Then, when a channel quality report would otherwise be transmitted by the UE, that transmission is inhibited (step 307).

In the exemplary embodiment, the UE is presumed to have calculated a duration of expected channel estimate predictability and of impairment stability. If this duration is long enough, it is possible for the UE to skip the transmission of more than one channel quality report. Accordingly, the UE ascertains whether this duration has been reached (decision block 309). If not ("NO" path out of decision block 309), then transmission of the next channel quality report is also skipped by jumping back to step 307.

The process loops in this way until the duration of channel estimate predictability and impairment stability has been reached ("YES" path out of decision block 309), at which point the UE determines a measure of channel quality (step 311) and transmits this information to the base station in a channel quality report (step 313). Processing then repeats by jumping back to step 301.

Returning to decision block 303, if it was determined that channel prediction reliability and/or impairment stability are not good enough ("NO" path out of decision block 303), then no channel quality reports are skipped, and the UE simply proceeds by ascertaining a measure of channel quality (step 311) and transmitting this channel quality report to the base station (step 313).

Figure 4:
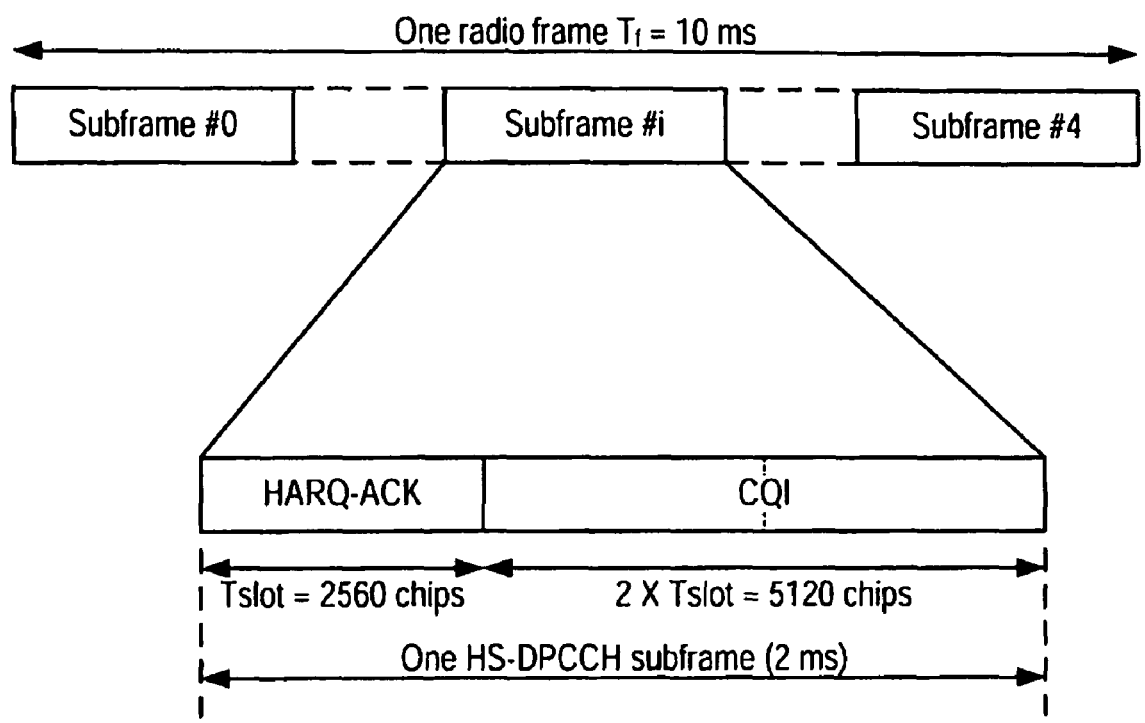
FIG. 4 is a signal format diagram illustrating an HS-DPCCH frame structure for carrying ACK/NACK information as well as CQI information on the HSPA uplink.

As mentioned earlier, some embodiments do not include a step of informing the base station about a planned inhibition of a channel quality report transmission. In such embodiments, the base station uses blind detection techniques to detect whether any given channel quality report is present or absent. For example, in an HSPA system, uplink control signaling is required to support the operation of the hybrid-ARQ (HARQ) protocol and to provide the base station (called "NodeB" in an HSPA system) with knowledge about the instantaneous downlink channel conditions. This signaling is carried out on an uplink physical channel, called the High Speed Dedicated Physical Control Channel (HS-DPCCH), which has its own separate channelization code to separate it from other channels. FIG. 4 is a signal format diagram illustrating an HS-DPCCH. As illustrated, one radio frame lasting 10 ms is subdivided into five equal-length subframes. Each of these subframes is further subdivided into three slots, each slot being long enough to accommodate 2560 chips. The first of these slots carries the HARQ information ("HARQ-ACK"), that is, whether the UE is reporting an acknowledgement ("ACK") or negative acknowledgement ("NAK"). The remaining two slots in each subframe are configured together to carry a channel quality report in the form of a CQI value.

If, in accordance with some embodiments of the invention, a UE decides to inhibit transmission of the CQI value, this can be accomplished by means of discontinuous transmission (DTX), whereby the UE turns off the transmission of the HS-DPCCH for the duration of the two slots that normally convey the CQI value. The base station can advantageously use this fact in a blind detection technique in which the signal power at the output of its receiver HS-DPCCH despreader is tested. The level of the receiver power for the HS-DPCCH code will indicate whether a CQI signal from the UE is present (i.e., whether the CQI is present) or whether these two slots contained just noise.

Figure 5:
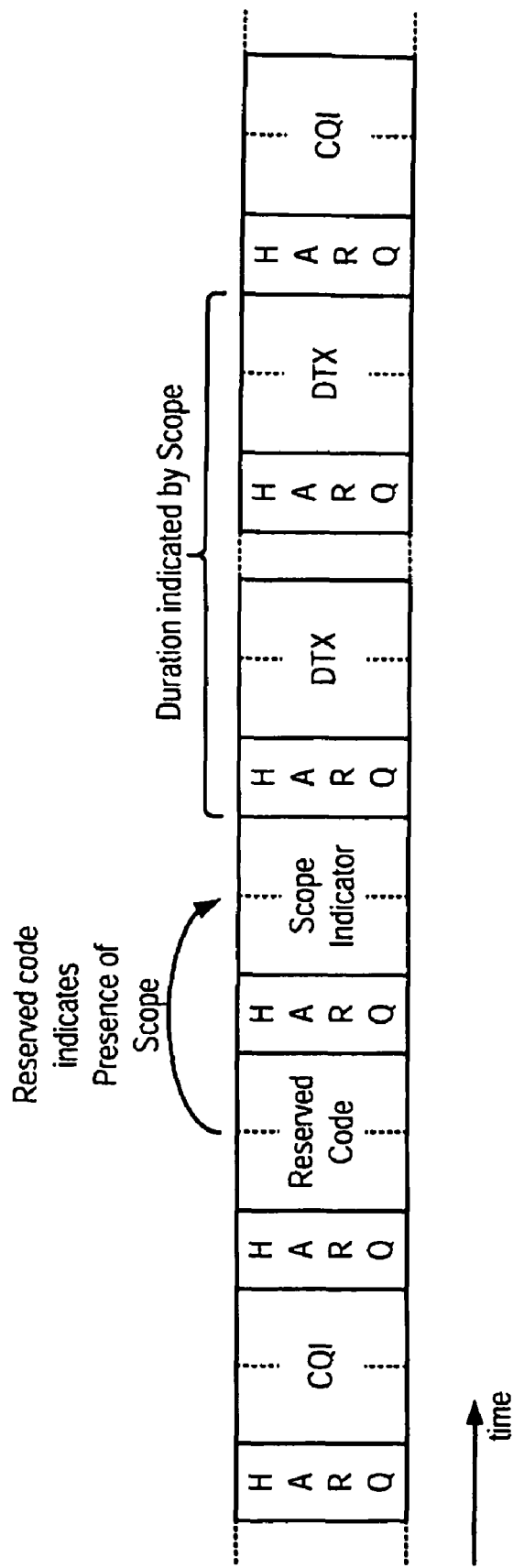
FIG. 5 is a signal diagram indicates a sequence of HS-DPCCH subframes, with one including a reserved code that indicates the presence of a scope indicator in a next subframe.

The discussion will now focus on embodiments in which the base station is informed by the UE that one or more channel quality reports will not be transmitted (e.g., step 305 illustrated in FIG. 3). One way of implementing this is for the UE to report an augmented channel quality report in which the augmented information specifies that an existing environment contains reliable channel predictability and stable interference. This predictability and stability can be presumed to last a predefined length (e.g., some number of subframes). Alternatively, the channel quality report can, in some embodiments, be further augmented with a field designating a computed duration for this environment (i.e., the "duration" discussed earlier with respect to the embodiments illustrated by FIG. 3). The duration value represents a range from a minimum duration to some maximum duration. In this discussion, this duration amount is referred to as a "scope indicator". A way of implementing this in existing systems (e.g., HSPA systems) is to reserve one possible codeword of the CQI field to indicate that the CQI field in the next HS-DPCCH subframe should be interpreted as a scope indicator. The scope indicator is then transmitted in the field normally reserved for the CQI in that next subframe. Subsequently, the CQI field is turned off (e.g., DTX'd) to reduce uplink feedback. This embodiment is illustrated in FIG. 5, which is a signal diagram indicates a sequence of HS-DPCCH subframes, with one including a reserved codeword that indicates the presence of a scope indicator in a next subframe. The scope indicator informs the base station of the duration of CQI transmission inhibition.

A non-limiting exemplary embodiment implemented in the context of HSPA will now be described in greater detail. In non-MIMO mode, the CQI field shown in FIG. 4 consists of 20 coded bits which are generated using a (20,5) block code. The five information bits are used to represent 31 possible values for the CQI indicator (values 0-30). The information bit sequence (0,0,0,0,0) is unused in the current standard. In accordance with an aspect of some embodiments consistent with the invention, this unused sequence is utilized to indicate that the next CQI report should not be interpreted as a CQI, but rather as a scope indicator as described above. Since five information bits are available, the scope could take on 32 possible values specifying a duration period for a stable and predictable CQI. After the scope indicator is communicated to the base station (Node B), subsequent CQI fields are DTX'd as described above until the duration specified by the scope expires.

An alternative to this approach leaves (0,0,0,0,0) as an unused sequence in the CQI encoding scheme, but reserves one of the allowed CQI values (e.g., CQI0) to indicate that the next CQI report is to be interpreted as a scope indicator. This reduces the dynamic range of the CQI reports slightly. However, the target of the current invention is a set of terminals having a very good CQI that is both stable and predictable so as to enable large data transfers without CQI reports. As it is possible to target which terminals will use the redefined CQI reports (see further discussion below), a reduction of the dynamic range at the low end is not believed to be a problem.

For terminals configured in MIMO mode, a similar approach is used as for non-MIMO mode. In MIMO mode, two types of CQI reports are made by the UE, referred to as Type A and Type B. Type A reports include either 1 or 2 CQI values, depending on whether or not the UE prefers single or dual-stream transmission, plus an indication of the preferred precoding configuration (PCI). Type B reports indicate the channel quality exclusively for single-stream transmission, regardless of what number of streams the UE prefers. This gives extra information to the scheduler in Node B in case it needs to override a UE's preference for dual-stream transmission. The relative frequency of Type A and Type B reports is configured by the network. For example, the network could specify that one out of every eight CQI reports is Type B.

In the current HSPA standard, Type B reports have the same unused bit sequence (0,0,0,0,0) as for UEs configured in non-MIMO mode. Hence, a similar scheme as described above could be used. The main difference is that the UE has to wait until the first available Type B reporting period occurs before it can utilize the (0,0,0,0,0) sequence to indicate that the next CQI report (likely a Type A report) should be interpreted as a scope indicator. This extra waiting time can easily be accounted for at the UE by reducing the scope by the waiting time.

In a similar fashion as described above, an alternative scheme could be used whereby a certain CQI value (e.g., CQI0) is reserved to indicate that the next CQI report shall be interpreted as a scope indicator instead of relying on the unused bit sequence in Type B reports. An advantage of this alternative is that it is not necessary to wait for a Type B reporting interval in order to indicate the scope. To take one of many possible examples, CQI0 could be reserved in both Type A and Type B reports for this purpose.

For both alternatives, the number of possible scope values could be quite large. Type A reports are encoded using a (20,10) code; hence, 10 information bits are available (1024 possible scope values). Type B reports are encoded using a (20,7) code; hence 7 information bits are available (128 possible scope values). If this is more than necessary, a modified coding format can be used. For example, the same (20,5) code as in MIMO mode can be used for the scope indicator, thus limiting the number of possible scope values to 32. The increased coding gain of such a code can be used to either reduce the amount of power necessary to transmit the CQI, or to improve the detection performance (or both).

In still other alternatives in which a scope indicator is transmitted, in addition to the duration of the period in which the UE will not transmit channel quality reports, the UE additionally provides the base station with an indication of a starting and an ending modulation and coding scheme (e.g., the recommended rate that is normally part of a CQI report). This would provide the base station with better information for use in deciding the transport format to use for the period of time in which it will not be receiving any channel quality reports.

Each of the above embodiments requires some reinterpretation of the CQI field in order to signal the scope indicator. Hence, there must be some common understanding between the UE and Node B about what signaling format is used. One way to enable this is by means of higher layer signaling that places scope-reporting UEs in a special mode. This signaling could be done once at call setup time, meaning that that this mode would be static for the duration of the call. Alternatively, the mode can be dynamically turned on and off under control of the network. To enable this, Node B could observe the reported CQIs over some time window and determine itself if the CQI is stable. If stability is detected, the Node B activates the new mode, thus requiring the UE to start reporting scope indicators.

Figure 6:
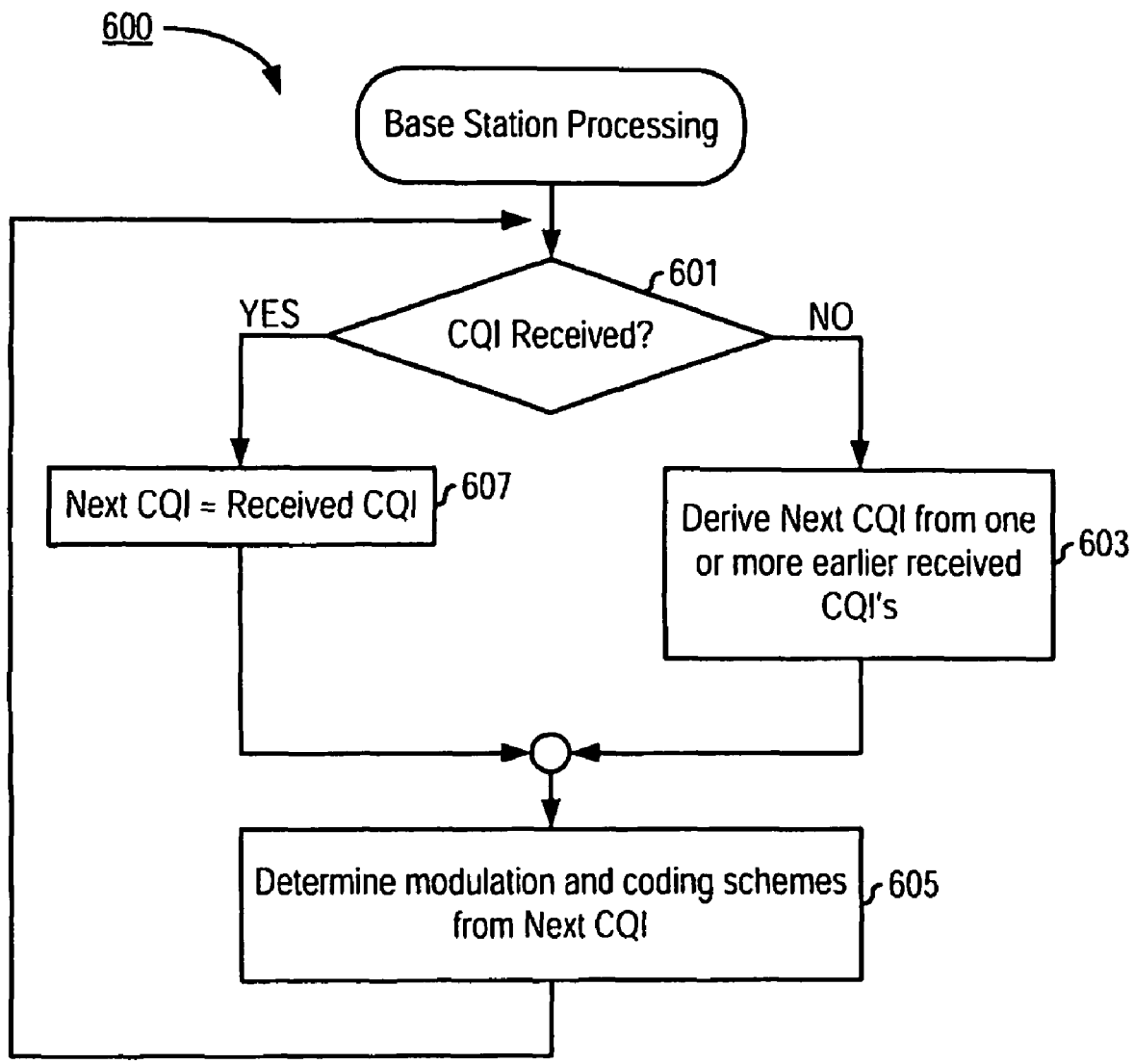
FIG. 6 is, in one respect, a flow chart of exemplary steps/processes carried out by, for example, a controller in a base station in accordance with aspects of the invention.

Practicing any of the various embodiments of the invention in a UE has implications for its counterpart base station. FIG. 6 is, in one respect, a flow chart of exemplary steps/processes carried out by, for example, a controller 600 in a base station in accordance with aspects of the invention. In other respects, FIG. 6 can be considered to depict a block diagram of a controller 600 in a base station, comprising logic configured to perform the variously illustrated functions. It will be appreciated that base station operation encompasses a wide variety of functions. To simplify matters, only those functions that are pertinent to aspects of the invention are depicted in FIG. 6 and described herein.

When a UE operates in a manner that allows it to transmit or inhibit transmission of a channel quality report, the base station's operation needs to respond accordingly. Therefore, one of the base station's functions is to determine whether or not a channel quality report (e.g., a CQI value) has been received (decision block 601). In some embodiments, this involves determining whether this information has been expressly communicated by the UE. As described above, this can be done in any number of ways, such as by reserving one of the channel quality report codes as an indicator that one or more upcoming channel quality reports will not be sent.

When the UE does not directly inform the base station that one or more upcoming channel quality reports will not be sent, the base station can determine this information by means of any of a number of possible blind detection techniques.

One of these is that, while the mobile may decide to inhibit transmission of the CQI report, it still may have to transmit an ACK/NACK back to the base station. Consequently, the base station must detect whether the ACK/NACK alone or the ACK/NACK together with the CQI report was transmitted. In embodiments, this information is expressly signaled by the UE, as discussed earlier. However, in embodiments in which the UE does not perform this function, the base station generally does not know which it will receive, in which case it performs this detection blindly. Blind detection techniques were described above.

Another base station consideration is that, when no CQI is reported from the UE ("NO" path out of decision block 601), the base station must determine from the previous channel quality reports the modulation and coding schemes to use for transmission. In the exemplary embodiment shown in FIG. 6, this involves deriving a predicted channel quality report (called "Next CQI" in the figure) from one or more earlier channel quality reports (step 603) and then using the predicted channel quality report as a basis for determining modulation and coding schemes (step 605).

Different approaches can be considered for deriving the predicted channel quality report. For example, let $\hat{\gamma}_m$ represent the CQI to be used to determine link adaptation at time m. A number of approaches can be used to determine $\hat{\gamma}_m$ based on the CQI reports corresponding to times $\gamma_n$ (where n≦M) and on $\gamma_p$ (where p≧m) These approaches are:

Use the most recent CQI report from the mobile, thus set $\hat{\gamma}_m = \gamma_n$.

Another approach is to use the smaller of the value of predicted CQI and the most recent CQI, thus set $\hat{\gamma}_m = \min(\gamma_n, \gamma_p)$. This conservative approach ensures that that the link adaptation will be based on whichever one of the most recent and predicted CQIs indicates a worse channel quality.

Yet another approach is to compute $\hat{\gamma}_m$ by filtering the previous and predicted CQI values. For example, linear interpolation of the CQI values gives $$\hat{\gamma}_m = \gamma_n + (\gamma_p - \gamma_n)\frac{m-n}{p-n}.$$

More complicated filters that account for additional CQI reports can also be considered.

Still another approach that is usable if a duration value is specified in the CQI report is to use the last-determined modulation and coding scheme for that duration or until the mobile preempts with another CQI report.

Returning to a consideration of decision block 601, if the channel quality report is expressly received from the UE ("YES" path out of decision block 601), the next channel report to be used as a basis for modulation and coding scheme decisions is the report expressly received from the UE (step 607). The modulation and coding schemes are then determined as before (step 605).

Various embodiments of the invention provide a number of advantages over conventional techniques. For example, by enabling the channel quality report to be selectively omitted from some transmissions, less feedback is required for this reporting. This is especially important for mobiles capable of higher data rates (especially in MIMO mode) because even more channel quality feedback is used and this puts a higher load on the amount uplink resources required. But by practicing embodiments of the invention, the required uplink resources can be reduced when channel quality reports are stable/predictable, thereby favorably impacting the noise-rise observed at the base station.

In another aspect, accounting for the stability of the channel quality information can be used to assist in scheduling of mobiles with greater accuracy over longer time-frames.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability, further comprising inhibiting transmission of the channel quality report to the node of the mobile communication system for a duration of time corresponding to the measure of reliability of the predicted channel estimate and of impairment stability.

2. The method of claim 1, comprising:
prior to inhibiting transmission of the channel quality report to the node of the mobile communication system for the duration of time corresponding to the measure of reliability of the predicted channel estimate and of impairment stability, transmitting to the node of the mobile communication system an indicator that transmission of the channel quality report will be inhibited.

3. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability, wherein the measure of reliability of the predicted channel estimate and of impairment stability comprises a part that is representative of reliability of the predicted channel estimate and a part that is representative of reliability of impairment stability; and
the part that is representative of reliability of the predicted channel estimate is generated as a function of a variance of a channel prediction error.

4. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability;
estimating an impairment covariance matrix; and
determining total impairment power from the impairment covariance matrix,
wherein:
the measure of reliability of the predicted channel estimate and of impairment stability comprises a part that is representative of reliability of the predicted channel estimate and a part that is representative of reliability of impairment stability; and generating the part that is representative of impairment stability comprises determining how quickly the total impairment power varies.

5. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability;
estimating an instantaneous impairment covariance matrix;
generating a smoothed impairment covariance matrix from two or more previously determined covariance matrices, wherein:
the measure of reliability of the predicted channel estimate and of impairment stability comprises a part that is representative of reliability of the predicted channel estimate and a part that is representative of reliability of impairment stability; and
generating the part that is representative of impairment stability comprises comparing the instantaneous impairment covariance matrix with the smoothed impairment covariance matrix.

6. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability;
estimating a data covariance matrix; and
determining total data power from the data covariance matrix,
wherein:
the measure of reliability of the predicted channel estimate and of impairment stability comprises a part that is representative of reliability of the predicted channel estimate and a part that is representative of reliability of impairment stability; and
generating the part that is representative of impairment stability comprises determining how quickly the total data power varies.

7. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability;
estimating a measure of a channel prediction error;
wherein:
the measure of reliability of the predicted channel estimate and of impairment stability comprises a part that is representative of reliability of the predicted channel estimate and a part that is representative of reliability of impairment stability; and
generating the part that is representative of reliability of the predicted channel estimate comprises determining a variance of the channel prediction error.

8. A method of operating a user equipment in a mobile communication system, the method comprising:
generating a measure of reliability of a predicted channel estimate and of impairment stability, wherein the predicted channel estimate is a predicted estimate of a channel between the user equipment and a node of the mobile communications system; and
controlling transmission of a channel quality report to the node of the mobile communication system as a function of the generated measure of reliability of the predicted channel estimate and of impairment stability, wherein controlling the transmission of the channel quality report to the node of the mobile communication system as a function of the generated measure of reliability of the predicted channel estimate and of impairment stability comprises:
transmitting to the node of the mobile communication system an indicator of a duration of time corresponding to the measure of reliability of the predicted channel estimate and of impairment stability.

9. The method of claim 8, comprising:
transmitting to the node of the mobile communication system an indicator of a recommended start and recommended ending modulation and coding schemes for use during a period of time when transmission of the channel quality report to the node of the mobile communication system will be inhibited.

10. A method of operating a node in a mobile communication system, wherein the node serves a user equipment located within a service area of the node, the method comprising:
receiving a signal from the user equipment, wherein at least a portion of the signal is reserved for conveying a channel quality report;
receiving a duration value from the user equipment; and
estimating a channel quality report for use in determining modulation and coding schemes for use in subsequent transmission operations whenever the received signal does not include the channel quality report,
wherein estimating the channel quality report for use in determining modulation and coding schemes for use in subsequent transmission operations comprises:
using a received channel quality report that was most recently received from the user equipment as an estimate of a next channel quality report,
and wherein using the received channel quality report that was most recently received from the user equipment as the estimate of the next channel quality report continues for an amount of time corresponding to the received duration value or until a new channel quality report is received from the user equipment, whichever is shorter.

11. A method of operating a node in a mobile communication system, wherein the node serves a user equipment located within a service area of the node, the method comprising:
receiving a signal from the user equipment;
ascertaining whether the received signal includes a channel quality report; and
if it is ascertained that the received signal does not include the channel quality report, then estimating a channel quality report for use in determining modulation and coding schemes for use in subsequent transmission operations, wherein estimating the channel quality report for use in determining modulation and coding schemes for use in subsequent transmission operations comprises:

predicting a channel quality report;

using, as an estimate of a next channel quality report, whichever one of a channel quality report that was most recently received from the user equipment and the predicted channel quality report indicates a worse channel quality.

12. A method of operating a node in a mobile communication system, wherein the node serves a user equipment located within a service area of the node, the method comprising:

receiving a signal from the user equipment;

ascertaining whether the received signal includes a channel quality report; and if it is ascertained that the received signal does not include the channel quality report, then estimating a channel quality report for use in determining modulation and coding schemes for use in subsequent transmission operations, wherein estimating the channel quality report for use in determining modulation and coding schemes for use in subsequent transmission operations comprises:

predicting a channel quality report;

generating a filtered channel quality report from the predicted channel quality report and one or more channel quality reports that were most recently received from the user equipment; and using the filtered channel quality report as an estimate of a next channel quality report.

13. The method of claim 12, wherein generating a filtered channel quality report from the predicted channel quality report and one or more channel quality reports that were most recently received from the user equipment comprises applying linear interpolation to the predicted channel quality report and one or more channel quality reports that were most recently received from the user equipment.

14. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability, wherein the logic configured to control the transmission of the channel quality report to the node of the mobile communication system as a function of the generated measure of reliability of the predicted channel estimate and of impairment stability comprises:

logic configured to inhibit transmission of the channel quality report to the node of the mobile communication system for a duration of time corresponding to the measure of reliability of the predicted channel estimate and of impairment stability.

15. The apparatus of claim 14, comprising:

logic configured to transmit to the node of the mobile communication system an indicator that transmission of the channel quality report will be inhibited.

16. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability, wherein:

the measure of reliability of the predicted channel estimate and of impairment stability comprises a part that is representative of reliability of the predicted channel estimate and a part that is representative of reliability of impairment stability; and the logic configured to generate the measure of reliability of the predicted channel estimate and of impairment stability generates the part that is representative of reliability of the predicted channel estimate as a function of a variance of a channel prediction error.

17. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability;

logic configured to estimate an impairment covariance matrix; and logic configured to determine total impairment power from the impairment covariance matrix, wherein:

the measure of reliability of the predicted channel estimate and of impairment stability comprises a part that is representative of reliability of the predicted channel estimate and a part that is representative of reliability of impairment stability; and the logic configured to generate the measure of reliability of the predicted channel estimate and of impairment stability generates the part that is representative of impairment stability by means of a process that comprises determining how quickly the total impairment power varies.

18. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability;

logic configured to estimate an instantaneous impairment covariance matrix;

logic configured to generate a smoothed impairment covariance matrix from two or more previously determined covariance matrices, wherein:

the measure of reliability of the predicted channel estimate and of impairment stability comprises a part that is representative of reliability of the predicted channel estimate and a part that is representative of reliability of impairment stability; and the logic configured to generate the measure of reliability of the predicted channel estimate and of impairment stability generates the part that is representative of impairment stability by means of a process that comprises comparing the instantaneous impairment covariance matrix with the smoothed impairment covariance matrix.

19. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability;

logic configured to estimate a data covariance matrix; and logic configured to determine total data power from the data covariance matrix, wherein:

the measure of reliability of the predicted channel estimate and of impairment stability comprises a part that is representative of reliability of the predicted channel estimate and a part that is representative of reliability of impairment stability; and the logic configured to generate the measure of reliability of the predicted channel estimate and of impairment stability generates the part that is representative of impairment stability by means of a process that comprises determining how quickly the total data power varies.

20. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability;

logic configured to estimate a measure of a channel prediction error;

wherein:

the measure of reliability of the predicted channel estimate and of impairment stability comprises a part that is representative of reliability of the predicted channel estimate and a part that is representative of reliability of impairment stability; and the logic configured to generate the measure of reliability of the predicted channel estimate and of impairment stability generates the part that is representative of reliability of the predicted channel estimate by means of a process that comprises determining a variance of the channel prediction error.

21. An apparatus for controlling operation of a user equipment in a mobile communication system, the apparatus comprising:

logic configured to generate a measure of reliability of a predicted channel estimate and of impairment stability, wherein the predicted channel estimate is a predicted estimate of a channel between the user equipment and a node of the mobile communications system; and logic configured to control transmission of a channel quality report to the node of the mobile communication system as a function of the generated measure of reliability of the predicted channel estimate and of impairment stability, wherein the logic configured to control the transmission of the channel quality report to the node of the mobile communication system as a function of the generated measure of reliability of the predicted channel estimate and of impairment stability comprises:

logic configured to transmit to the node of the mobile communication system an indicator of a duration of time corresponding to the measure of reliability of the predicted channel estimate and of impairment stability.

22. The apparatus of claim 21, comprising:

logic configured to transmit to the node of the mobile communication system an indicator of a recommended start and recommended ending modulation and coding schemes for use during a period of time when transmission of the channel quality report to the node of the mobile communication system will be inhibited.

23. An apparatus for controlling operation of a node in a mobile communication system, wherein the node serves a user equipment located within a service area of the node, the apparatus comprising:

logic configured to receive a signal from the user equipment, wherein at least a portion of the signal is reserved for conveying a channel quality report;

logic configured to receive a duration value from the user equipment; and logic configured to estimate a channel quality report for use in determining modulation and coding schemes for use in subsequent transmission operations whenever the received signal does not include the channel quality report, wherein the logic configured to estimate the channel quality report for use in determining modulation and coding schemes for use in subsequent transmission operations comprises:

logic configured to use a received channel quality report that was most recently received from the user equipment as an estimate of a next channel quality report, and wherein the logic configured to use the received channel quality report that was most recently received from the user equipment as the estimate of the next channel quality report continues using the received channel quality report that was most recently received from the user equipment as the estimate of the next channel quality report for an amount of time corresponding to the received duration value or until a new channel quality report is received from the user equipment, whichever is shorter.

24. An apparatus for controlling operation of a node in a mobile communication system, wherein the node serves a user equipment located within a service area of the node, the apparatus comprising:

logic configured to receive a signal from the user equipment;

logic configured to ascertain whether the received signal includes a channel quality report; and logic configured to estimate a channel quality report for use in determining modulation and coding schemes for use in subsequent transmission operations if it is ascertained that the received signal does not include the channel quality report, wherein the logic configured to estimate the channel quality report for use in determining modulation and coding schemes for use in subsequent transmission operations comprises:

logic configured to predict a channel quality report;

logic configured to use, as an estimate of a next channel quality report, whichever one of a channel quality report that was most recently received from the user equipment and the predicted channel quality report indicates a worse channel quality.

25. An apparatus for controlling operation of a node in a mobile communication system, wherein the node serves a user equipment located within a service area of the node, the apparatus comprising:

logic configured to receive a signal from the user equipment;

logic configured to ascertain whether the received signal includes a channel quality report; and logic configured to estimate a channel quality report for use in determining modulation and coding schemes for use in subsequent transmission operations if it is ascertained that the received signal does not include the channel quality report, wherein the logic configured to estimate the channel quality report for use in determining modulation and coding schemes for use in subsequent transmission operations comprises:

logic configured to predict a channel quality report;

logic configured to generate a filtered channel quality report from the predicted channel quality report and one or more channel quality reports that were most recently received from the user equipment; and logic configured to use the filtered channel quality report as an estimate of a next channel quality report.

26. The apparatus of claim 25, wherein the logic configured to generate a filtered channel quality report from the predicted channel quality report and one or more channel quality reports that were most recently received from the user equipment comprises logic configured to apply linear interpolation to the predicted channel quality report and one or more channel quality reports that were most recently received from the user equipment.

\* \* \* \* \*

UNITED STATES PATENT AND TRADEMARK OFFICE
CERTIFICATE OF CORRECTION

| | | |
|---|---|---|
| PATENT NO. | : 8,185,057 B2 | |
| APPLICATION NO. | : 12/346313 | |
| DATED | : May 22, 2012 | |
| INVENTOR(S) | : Molnar et al. | |

It is certified that error appears in the above-identified patent and that said Letters Patent is hereby corrected as shown below:

In Column 2, Line 52, delete "(VOIP)" and insert -- (VoIP) --, therefor.

In Column 3, Line 62, delete "system" and insert -- system. --, therefor.

In Column 13, Line 13, delete "(where $p \geq m$)" and insert -- (where $p \geq m$). --, therefor.

Signed and Sealed this
Eleventh Day of September, 2012

David J. Kappos
*Director of the United States Patent and Trademark Office*